UNITED STATES PATENT OFFICE.

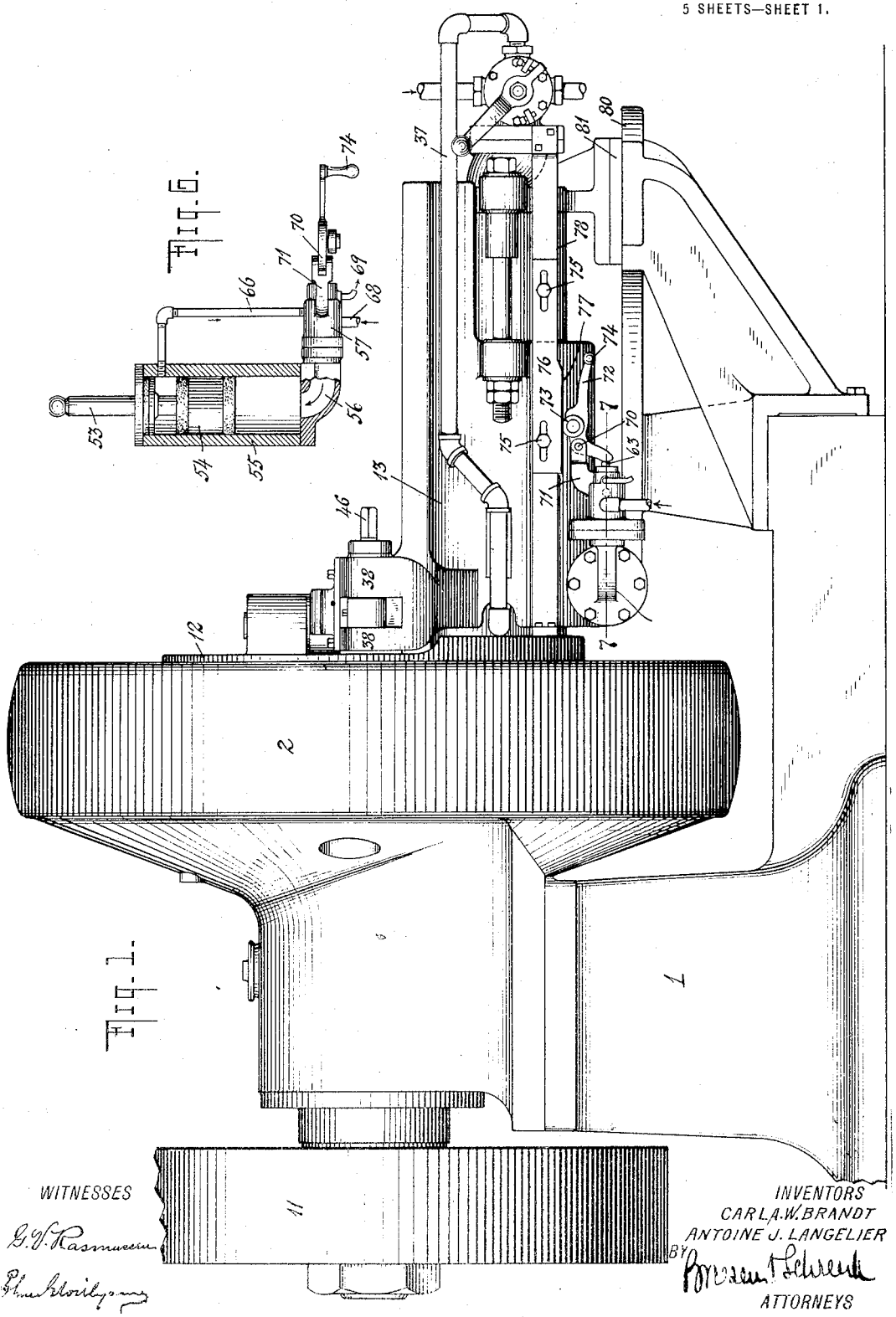

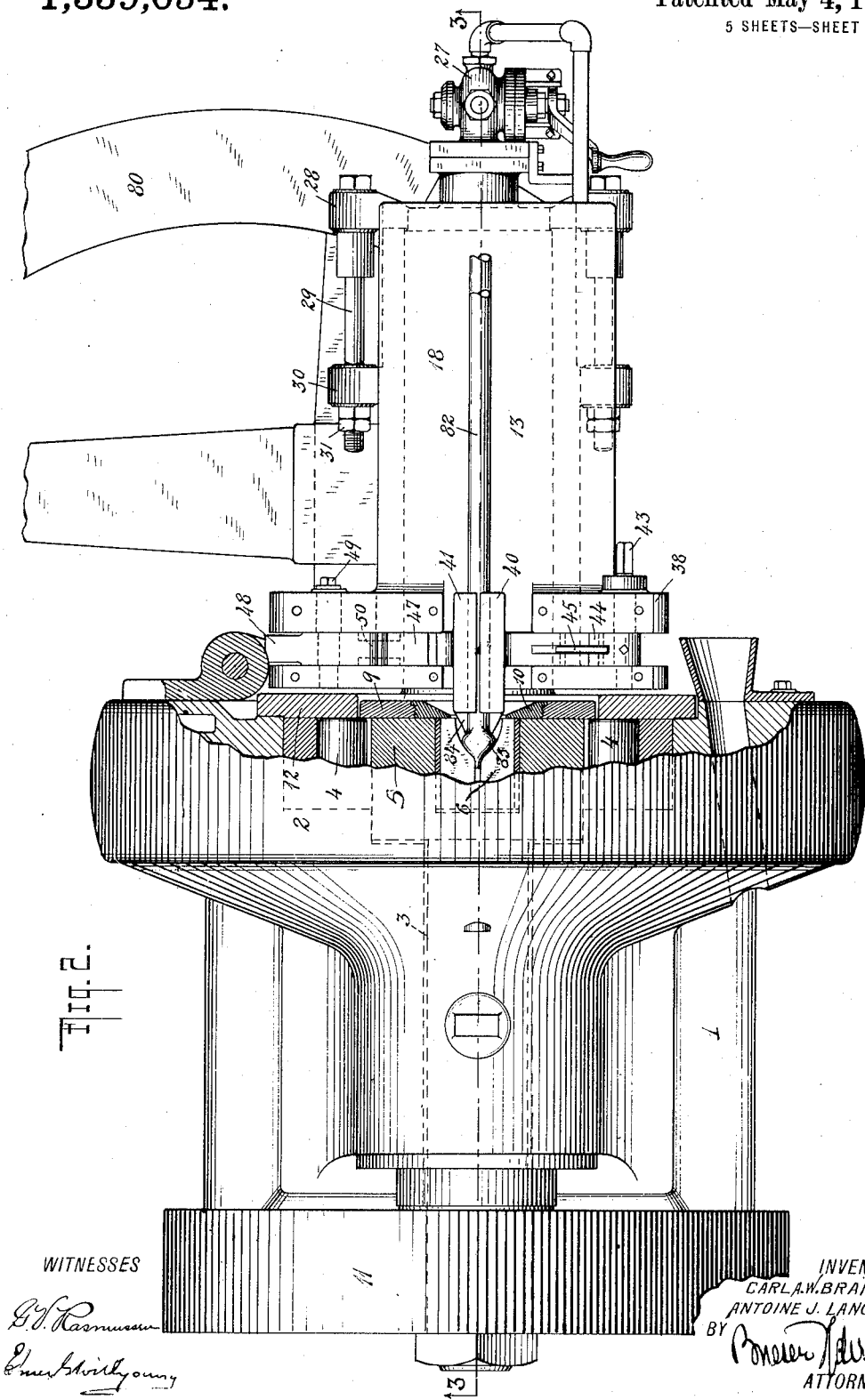

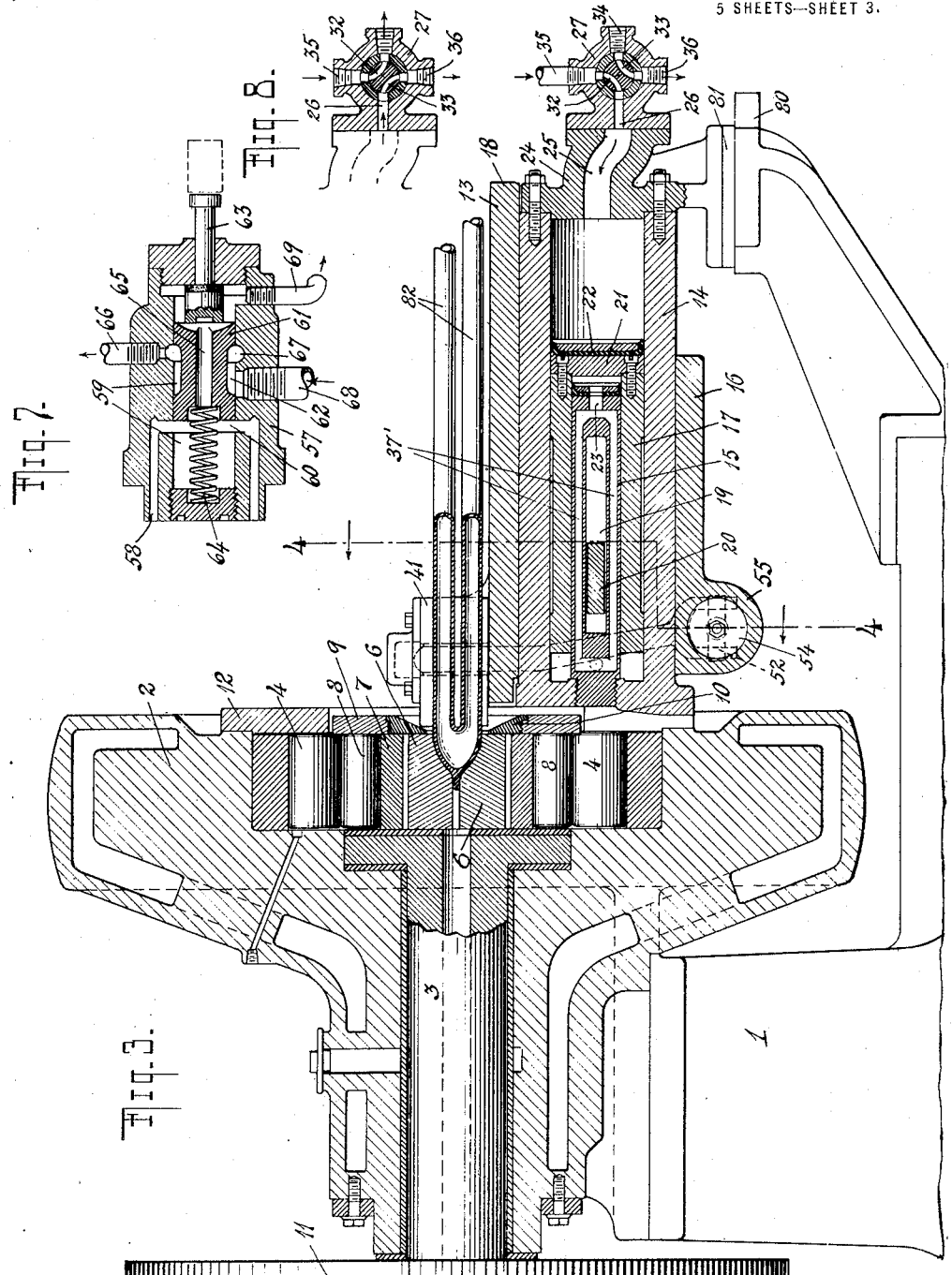

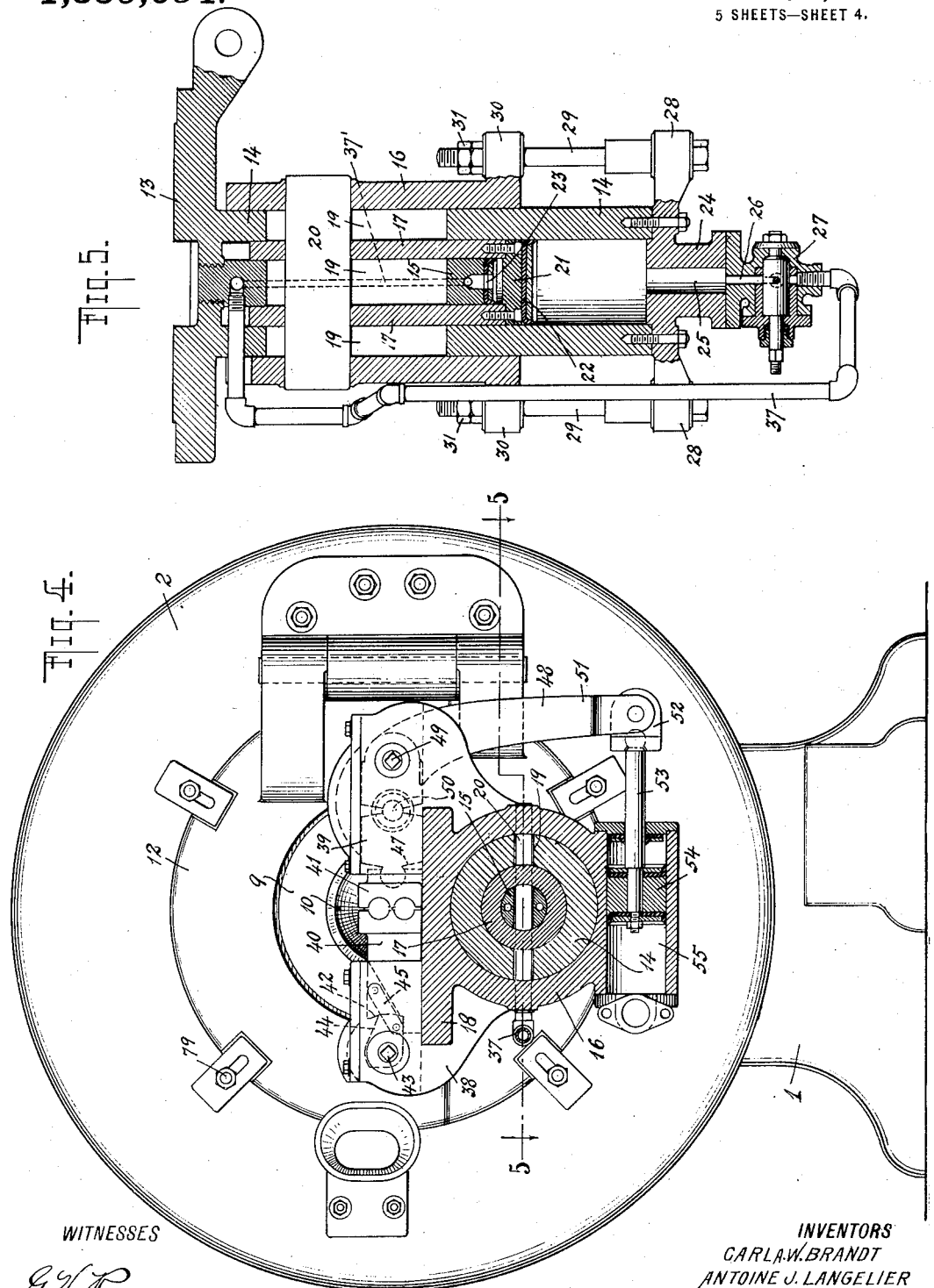

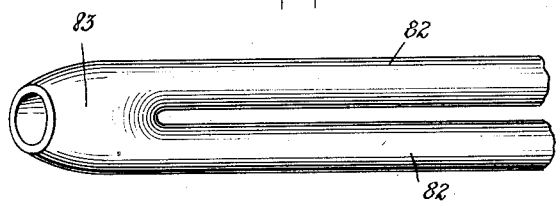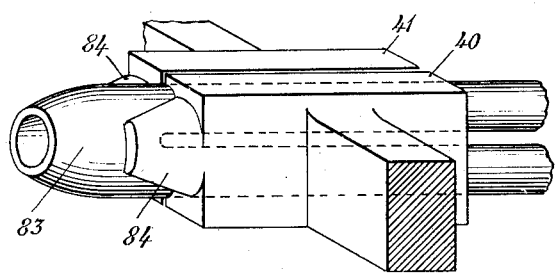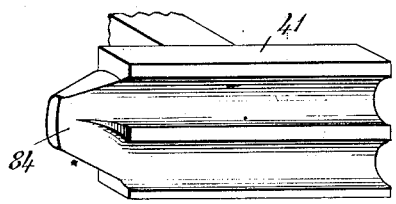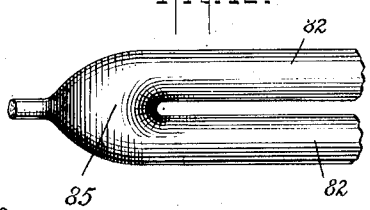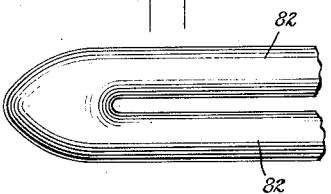

CARL A. W. BRANDT, OF MANHASSET, NEW YORK, AND ANTOINE J. LANGELIER, OF PROVIDENCE, RHODE ISLAND, ASSIGNORS TO LOCOMOTIVE SUPERHEATER COMPANY, OF NEW YORK, N. Y., A CORPORATION OF DELAWARE.

SWAGING-MACHINE FOR MAKING U-SHAPED PIPE-BENDS.

1,339,054.   Specification of Letters Patent.   Patented May 4, 1920.

Application filed September 26, 1918. Serial No. 255,745.

*To all whom it may concern:*

Be it known that we, CARL A. W. BRANDT and ANTOINE J. LANGELIER, both citizens of the United States, residing, respectively, at Manhasset, county of Nassau, and State of New York, and at Providence, Providence county, State of Rhode Island, have invented certain new and useful Improvements in Swaging-Machines for Making U-Shaped Pipe-Bends, of which the following is a specification.

Our invention relates to swaging machines and particularly to a machine of this class which, by reason of certain structural details and arragements, is peculiarly adapted to the manufacture of U-shaped pipe bends.

In Patent No. 1,169,209, dated January 25, 1916, there is described a new and improved method of making U-shaped pipe bends, such as are used in connection with boilers, superheaters and heating apparatus generally, and which are to be exposed to high temperatures or are to be used to carry steam or fluids under pressure. And in a subsidiary Patent 1,155,110, dated September 28, 1915, there is described a new and improved method of carrying out a single step of the method set forth in the first mentioned Patent No. 1,169,209, such step comprising the final closure and shaping of the incomplete pipe bend which is obtained as the result of certain initial and earlier steps set forth in the method of said Patent 1,169,209.

And the final step in performing this final closure and shaping of the incomplete pipe bend, as disclosed and described in the above mentioned subsidiary Patent No. 1,155,110, comprises swaging down the still open end of the bend and finally closing and shaping said end.

In the patent (No. 1,155,110), while dies suitable for carrying out the required swaging operation are shown, no special type of swaging machine for use with these dies nor, indeed, any type of swaging machine, is suggested.

It is an object of the present invention to provide a swaging machine capable of taking the incomplete bend, as found at a certain stage in the performance of the method disclosed in Patent No. 1,155,110, or rather, of taking the pair of pipes united by such incomplete bend, and of swaging the open end of such bend so as to close and more or less completely shape said end; and of accomplishing this result with convenience, certainty and despatch.

A particular object of our invention is to provide a pair of jaws for a swaging machine of the character described which shall be capable of so clamping and holding the pipes and the incomplete bend uniting them during the operation of the swaging dies, that neither the pipes nor the bend can be either individually or relatively twisted.

Our invention resides in certain structural details and combinations of parts, as will more particularly appear hereinafter.

Our invention will be better understood by referring to the accompanying drawings in which Figure 1 represents a side elevation of a preferred form of our improved swaging machine; Fig. 2 is a plan view of Fig. 1 with part of the casing broken away to better show the arrangement of dies, hammer blocks and actuating rollers; Fig. 3 is a central longitudinal section taken along the line 3—3 of Fig. 2; Fig. 4 is a transverse section taken along the line 4—4 of Fig. 3; Fig. 5 is a section, taken along the line 5—5 of Fig. 4, showing the construction of the work saddle and of the hydraulic devices by which it is controlled; Fig. 6 is a detail, part horizontal section and part plan, showing the construction of the automatically operated air piston and cylinder which controls the final pressure of the clamping jaws; Fig. 7 is a section, on an enlarged scale, taken along the line 7—7 of Fig. 1, showing the details of the valve which controls the air piston and cylinder of Fig. 6; Fig. 8 is a sectional view through the hydraulic valve 27 which controls the feed of the work saddle; Fig. 9 is a perspective view showing a pair of pipes united by an incomplete bend as they appear when ready to be worked upon by the machine of our invention herein disclosed; Fig. 10 is a similar view showing the pipes of Fig. 9 as they appear with relation to the clamping blocks when in the machine ready to be worked upon; Fig. 11 is a perspective view of the rear clamping block of Fig. 10; and Figs. 12 and 13 represent, respectively, perspective views of the bend as it is first taken from the machine and as it appears after the projecting teat is removed and the bulge flattened out.

Briefly described, the swaging machine of our invention comprises a head or casing provided with a pair of oppositely disposed and radially reciprocating swaging dies, these dies being operatively related to a driving shaft so as to be rotated thereby and arranged to be struck by fixed peripherally disposed actuating rollers, all in the manner usual with machines of this character.

A work saddle or carrier is arranged in front of the head and provided with suitable clamping blocks or jaws for holding the pair of pipes united by the incomplete bend while the swaging operation is being performed. These jaws are arranged to be initially brought together with moderate clamping effect by the aid of a manually operated handle. As the saddle moves or feeds the pipes forwardly so as to thrust the incomplete bend between the swaging dies, the clamping jaws are automatically brought closer together so as to grip the pipes with great pressure; this is accomplished by the aid of a suitable air piston and cylinder controlled by the movement of the saddle.

The saddle is of unique design and is moved in and out by hydraulic pressure applied through suitable valves. The arrangement of the saddle is such that great strength, together with great compactness, is attained.

A feature of the invention is the provision of clamping jaws having forwardly extending reinforcing members which fit snugly into the curvature of the bend on each side thereof, thus holding the bend rigidly in place during the operation of the swaging dies or hammers. The hammers are therefore unable to exert any twisting effect upon the bend itself or upon the bend relatively to the pipes which the bend connects.

In the drawings, a main base or frame 1, is formed with a cylindrical and preferably integral casing 2 which is bored out axially to serve as a bearing for a main shaft 3 and is recessed on its front to receive the usual plurality of fixed peripherally disposed actuating rollers 4, as also to provide space for the revolving head 5 attached to shaft 3. In a diametral slot formed in this head, is a pair of oppositely disposed die blocks 6 and outside of each die block a hammer block 7 and attached hammer roller 8.

A retaining ring 9, having a central opening, giving access for the work to the die blocks, is bolted to the head 5 and closes the front of the slot which contains the die blocks and hammer blocks. This ring is readily removable and enables die blocks and hammer blocks to be gotten at for inspection or repair very quickly and simply. If die blocks only are to be gotten at or removed, then an inner section 10 of the main ring 9, which is threaded therein, may be disattached without interference with said main ring.

Shaft 3 is driven by a suitable pulley 11 attached thereto.

Hinged upon the front, and at one side of casing 2, is a ring 12 which not only serves to cover the actuating rollers 4 and hold them in position, but also carries the reciprocating saddle or carrier 13 upon which are mounted the clamping jaws, with their operating mechanism, which feed the work into the swaging dies or die blocks 6.

This saddle 13 comprises a forwardly projecting tube 14 surrounding and spaced from a concentric but substantially shorter cylinder 15, both tube and cylinder being attached (the former integrally) to ring 12. Surrounding and slidably fitted upon tube 14 is an outer tube 16 of about the same length as cylinder 15; and fitting slidably in the space between tube 14 and cylinder 15 is another tube 17 also having about the same length as cylinder 15. The top of tube 16 has, as best appears in Figs. 2, 3, 4, an attached (preferably integrally) table 18, whose length is considerably greater than that of the tube proper.

A horizontal slot 19, of uniform cross-section, is formed in tube 14 and cylinder 15 and a transverse key 20 has slidable fit with said slot and is fixed in tubes 16 and 17 which are, therefore, movable as one structure with respect to tube 15 and cylinder 16 within the length of the slot.

The outer end of tube 17 is closed by a head 21 provided on its outer face with a suitable packing 22. The end of cylinder 15 is recessed slightly and also provided with a suitable packing 23.

The outer end of fixed tube 14 is closed with a head 24 traversed by a passage 25 which communicates with a passage 26 formed in a valve 27 carried upon the outer end of the head.

Fixed in arms 28, which project laterally from head 24, are limit rods 29 which are slidable in lugs 30 attached to the outer movable cylinder 16. Nuts 31 are adjustable on these rods so as to vary the length through which the outer cylinder with its table 18 and associated parts, may be moved.

Valve 27 comprises a casing traversed by a conical plug having two opposite curved passages 32 and 33, each of which subtends an arc of 90° upon the periphery of the plug. The casing, besides passage 26 above referred to, has an opposite passage 34, in prolongation of passage 26, opening from the plug to the outside of the casing and vertical upper and lower passages 35 and 36 also extending from the plug through the casing.

Passage 35 is joined to a water supply of suitable pressure, passage 36 constitutes an outlet passage for used water, and passage 34, through a pipe 37, and longitudinal passages 37' formed in cylinder 15, opens into the recess at the end of cylinder 15 just behind head 21.

When the plug of valve 27 is in the position shown in Fig. 3, e. g., water enters by passage 35, curved passage 32, passage 26 and passage 25 to the space at the outer end of tube 14 in front of head 21. The space behind head 21 between said head and the end of cylinder 15, is open through passages 37', pipe 37 and curved passage 33 to the lower or outlet passage 34. The composite structure comprising tubes 16 and 17, the former carrying table 18, will be pressed inwardly toward the casing 2 until stopped by the engagement of lugs 30 with nuts 31.

Similarly, when the plug of valve 27 is rotated through 90° into the position shown in Fig. 8, water will pass from passage 35, through curved passage 32 and pipe 37, to the space behind head 21 while the space in front of head 21 at the end of tube 14 will now be connected, through passages 25, 26 and curved passage 33 with the outlet passage 36. This will cause the table to be moved outwardly until stopped by the engagement of lugs 30 with the shouldered outer ends of limit rods 29.

Mounted upon the inner end of table 18 between opposite pairs of guides 38, 39, are clamping jaws 40, 41, the heads of which are provided with opposed and parallel semicircular grooves adapted to inclose and hold, when the heads are brought together, a pair of pipes 82 united by an incomplete pipe bend 83, as previously set forth, so that by suitably moving the table 18 inwardly the bend may be inserted into, and operated upon, by the die blocks 6.

The outer end of jaw 40 is provided with a cylindro-concave stop face 42 struck upon a center 43 upon which is pivoted a stop lug 44 whose outer end is complementary to face 42. This outer end and the jaw 40 are connected together by a link 45, both lug and jaw being slotted to receive the link. Lug 44 is adapted to be rotated about center 43 by means of a suitable handle to be attached to the squared end 46 of the shaft upon which the lug pivots and to which it is attached. When the lug is rotated clockwise (Fig. 4) the jaw 40 is moved inwardly and the free end of the lug engages stop face 42, the lug being stopped by the outwardly projecting end of the jaw at the bottom of its face 42. The lug, therefore, serves as an abutment to resist any outward pressure put upon jaw 40 and since the pivotal connection of lug and link 45 will then lie below the line joining center 43 and the pivotal connection between link 45 and jaw 40, there can be no possible giving way of the jaw in response to such outward pressure.

When the lug, on the other hand, is rotated counter-clockwise, its free end is raised above and entirely out of engagement with the jaw and the latter is moved away from the opposite jaw 41 through the action of link 43.

The shank of jaw 41 is quite short and is pivotally mounted upon a longitudinally disposed pin forming part of a pressure member 47 which, like the jaw shank, is held between the guides 39. The free outer end of member 47 is provided with a cylindro-concave bearing groove arranged opposite a similar groove in the shorter arm of a powerful bell crank lever 48, also held and pivotally mounted between guides 39 upon a shaft 49 to which it is fixed. A bearing or pressure cylinder 50 occupies the two bearing grooves referred to.

If the longer arm 51 of the lever 48 is moved outwardly (to the right, Fig. 4), its shorter arm will be moved correspondingly downward, carrying with it the bearing cylinder 50 and the outer end of pressure member 47. Jaw 41 will thus be forced closer to its mate 40.

The outer end of arm 51 is pivotally connected with one end of a universal joint member 52 and the other end of this member has universal connection with the free end of a piston rod 53 of a piston 54 inclosed and adapted to reciprocate in an air cylinder 55 formed transversely at the inner end and upon the lower side of slidable tube 17.

The cylinder end (left, Fig. 4) of air cylinder 55 has a lateral extension, pierced by a passage 56 and carrying an air control valve 57 (shown enlarged in Fig. 7). This valve comprises a casing, the inner end of which has a plurality of circularly disposed air passages 58 which open into passage 56 at one end and are connected together and to a central cylinder space 59 by radial passages 60 at the other end. A piston 61, having a clearance space 62 between its ends, is contained within this cylinder space and provided with a piston rod 63; a spring 64 exerts a constant outward pressure upon the inner end of the piston. The piston is provided with a longitudinal passage 65 which connects together the cylinder spaces on the two sides thereof.

A pipe 66 connects the cylinder space at one end (right, Fig. 4) of cylinder 55 with the cylinder space 59 of the air valve 57, terminating in a port opening into an annular recess 67 formed in the cylinder wall part of which will be outside to the right of the outer end (right, Fig. 7) of piston 61 when the latter is pushed inwardly but opening into the clearance space 62 when the piston is in its outward position. A pipe 68, connected with a suitable supply of compressed air, also opens into cylinder space 59 at a point within the clearance space 62, regardless of which of its extreme positions may be held by the piston.

An exhaust pipe 69 opens from the extreme outer end (right, Fig. 7) of the control valve casing to the atmosphere; the adjacent end of piston 61 is turned down so that this pipe must always be open.

When piston rod 63 and piston 61 are pushed inwardly against the resistance of spring 64, pipe 66 will first be shut off by the outer end of, and will then be completely outside of, the piston, and clearance space 62 will unite air supply pipe 68 and passages 60. Air will therefore pass, by way of passages 58 and passages 56 into the cylinder space at the left-hand side (Fig. 4) of piston 54 and force said piston to the right. The cylinder space at the right of piston 54 will be open, by way of pipe 66, to the outer end of the control valve casing and thence through exhaust pipe 69 to the atmosphere.

When piston rod 63 and piston 61 are at the right, as in Fig. 7, air will pass from pipe 68, by way of clearance space 62 and pipe 66 to the right-hand side of piston 54 and push the same to the left, the cylinder space at the left-hand side of the cylinder now being open to the atmosphere by way of passage 56, passages 58 and 60, passage 65, and exhaust pipe 69.

Pivotally connected at 70 with a bracket 71, which is fixedly attached to the top of the air control valve casing, is a control lever 72 having a shorter arm, the end of which engages the end of piston rod 63, and a longer arm having a roller 73 and a handle 74.

Secured by screws 75 to a strap which is supported by the fixed portion of saddle 13, is a plate 76 whose lower edge is formed as a two step cam surface. The plate is so located that the lower step 77 is in engagement with the roller 73 for all positions of the slidable saddle 13, except when near its outer limits when the roller can move upwardly so as to engage the upper steps 78.

When the roller engages the lower step 77, the shorter arm of control lever 72 will force piston 61 of air control valve 57 inwardly and when, on the other hand, the roller engages the upper step 78, piston 61 will be forced to the right by spring 64.

Ring 12 is ordinarily clamped in position against the casing 2 by clamping plates and screws 79.

A curved rail 80 is erected upon frame 1 for the purpose of supporting the outer end of saddle 13 and adding to its rigidity. A special foot 81 is formed upon the saddle for this purpose; this foot rides upon the rail when the saddle is swung upon the hinges of ring 12.

The operation of our invention is as follows:

The drawings, Figs. 1–4 inclusive, show the saddle in its innermost position, i. e., in the position which it will attain when a given incomplete bend has been worked upon by the machine and made complete. In the position necessary before the work is first placed in the machine, the saddle will be in its outermost position (not shown) with hydraulic valve 27, as in Fig. 8. In such position the lugs 30 will lie against the shoulders at the outer ends of the limit rods 29. The roller 73 will lie against the upper step 78 of plate 76 and the piston 61 will be in its outermost position (as in Fig. 7), so that piston 54 will be at the left of air cylinder 55 instead of toward the right, as in Fig. 4, thus lifting bearing cylinder 50 and permitting jaw 41 to be in its outermost position. So, also, jaw 41 will have been drawn to the left (outwardly) by link 40 by reason of cam 44 which should have been rotated to its extreme counterclockwise position.

The pair of pipes 82 united by the incomplete bend 83, which should previously be raised to welding temperature, is now placed upon the table 18 with the pipes, one above the other and between the jaws 40 and 41, which will be open to receive them. The pipes should be properly located between the jaws with the concave surface of the bend firmly pressed against the support 84, later to be referred to. Lug 44 is now thrown clockwise, by the handle (not shown) which may be applied to squared end 46, thus moving jaw 40 inwardly to the right and clamping the two jaws 40 and 41, with moderate pressure against the pipes.

The handle of valve 27 in then thrown counterclockwise to the position shown in Fig. 1, thus placing the valve parts as they appear in Fig. 3. This will admit water into the outer end of tube 14 against the outer side of head or piston 21, thus causing the saddle 13 to be fed inwardly toward the casing 2 carrying along with it the pipes 82. As soon as roller 73 strikes the lower cam step 77, and this will be almost immediately after the saddle has begun its inward movement, the outer arm of lever 72 will be forced downwardly, thus moving piston 61 of air control 57 inwardly (left, Fig. 7) and hence lever arm 51 (Fig. 4) to the right. This will move jaw 41 inwardly against pipes 82 and clamp them against jaw 40 with very great pressure, making it quite impossible for the pipes to slip.

Meanwhile, as the saddle moves toward the casing 2, the incomplete bend 83 is slowly forced between the die blocks 6 which, being positioned in the head 5, are being rapidly revolved and, through hammer blocks 7 and actuating rollers 4, caused to rapidly swage down the end of the bend so as to close its opening and consolidate its metal, all as is usual in swaging machines.

The swaging operation being completed, the handle of hydraulic valve 27 is reversed (turned clockwise), thus placing the valve parts, as shown in Fig. 8. This will put the water pressure on the inside of head 21 instead of outside, as before, so that the saddle 13 will move outwardly, thus withdrawing the now substantially completed bend from between the die blocks.

As the saddle nears the outer limit of its movement, the roller 73 will pass from the lower cam step 77 to the upper step 78, thus sliding back the rear jaw 41. Cam 44 should now be rotated counter-clockwise, thus completely freeing the pipes 82 and permitting them to be removed.

The work will now appear as represented in Fig. 12 and will be complete except that the projecting teat must be cut off, its residual root be smoothed down, and a final shaping operation be performed. The smoothing of the root of the teat is readily and preferably performed by hand with the aid of a suitable swaging hammer. The shaping will be necessitated by the fact that the swaging operations, as described, will cause the bend to bulge in the region 85, in a direction transverse to the plane which includes the two pipes so as to extend on either side, beyond the tangent plane to both pipes on that side. By placing the bend in a suitable press, these bulges may be readily flattened out and brought back between these planes and the bend given the appearance shown in Fig. 13.

The machine, as illustrated and just above described, is capable of completing inchoate pipe bends such as are produced according to the previously mentioned Patent No. 1,155,110, with great convenience, economy and despatch. And the metal of the bends thus completed is firmly consolidated and accurately shaped to predetermined form.

The rapid rotation of the die blocks, while they are delivering their blows upon the pipe bend, exerts a very pronounced twisting force not only upon the bend proper but also at the junction of the bend with the pipes. At welding heat particularly, this twisting tendency is apt to result in a product which is either structurally defective or deformed, or both. To avoid this, we provide each jaw 40, 41, with an extension or support 84 which projects beyond the jaws proper toward the outer end of the bend and which is accurately fitted, on each side of the bend, to that region thereof which is immediately adjacent to the pipes proper. These extensions are tapered off on their outer surfaces so as to be clear of the die blocks, even when the pipe bend is in its extreme inner position with reference to the die blocks.

By thus having the larger portion of the bend proper supported by closely fitted surfaces which are rigidly a part of the jaws proper, the resistance to twisting is very greatly increased and in practice we find that the twisting effect is insignificant, the metal fibers in the finally completed bend being left straight and parallel with one another.

Variations of detail may, of course, be made by the aid of the mechanical skill of those versed in the art within the spirit and scope of the following claims:

1. In a swaging machine, a work table adapted to be moved toward and away from the die blocks, a pair of oppositely disposed clamping jaws upon said table, the outer end of one of said jaws having a cylindro-concave cam face, a cam member pivoted upon said table outside of said jaw end the outer end of said cam member having a face complementary to and adapted to engage the cam face of the jaw, and a link pivotally attached to both jaw and cam member so that upon rotation of the cam member upon its pivot the jaw will be moved inwardly and the cam faces engaged thus providing an abutment for the jaw, or the cam faces will be disengaged and the jaw moved outwardly.

2. In a swaging machine, a work table adapted to be moved toward and away from the die blocks, a pair of oppositely disposed clamping jaws upon said table the outer end of one of said jaws having a cylindro-concave cam face, a cam member pivoted upon said table outside of said jaw end, the outer end of said cam member having a face complementary to and adapted to engage the cam face of the jaw, and a stop at the bottom of the jaw cam face, said stop being positioned so that when the cam member is sufficiently rotated, its end will abut against said stop and the pivotal point of connection between link and cam member will lie below the straight line joining the center of rotation of said cam member with the pivotal point of connection between link and jaw.

3. In a swaging machine, a fixed hollow pressure cylinder closed at its outer end, a concentrically spaced and headed but shorter cylinder within the pressure cylinder, sleeves slidably fitted upon the pressure cylinder and between the pressure cylinder and inner cylinder respectively, the former sleeve carrying a work table and the inner sleeve having a packed head, a key uniting said sleeves and slidably engaged with a slot formed in the two cylinders, and means for applying fluid pressure at will on either side of the packed head.

4. In a swaging machine, a fixed guide member, a work table arranged to be moved upon said guide member toward and away from the die blocks, a movable clamping jaw and a fluid pressure cylinder carried by said table, a piston within said cylinder and connected with the clamping jaw, a lever actuated valve also carried by the table, and a cam upon the guide member arranged to engage the lever as the table moves in one direction and to disengage the lever as the table moves in the contrary direction thereby causing the clamping jaw to be moved in correspondingly opposite directions.

5. In a swaging machine for closing the end of an inchoate pipe bend uniting a pair of pipes, a pair of similar clamping jaws for holding the pipes and bend, each jaw having grooves which fit the respective pipes and also an extension which projects beyond the pipes proper and engages the body of the bend itself on each side thereof.

6. In a swaging machine for closing the end of an inchoate pipe bend uniting a pair of pipes, a pair of similar clamping jaws for holding the pipes and bend, each jaw having grooves which fit the respective pipes and also an extension which projects beyond the pipes proper and engages the body of the bend itself on each side thereof, the outer surface of the extension being tapered toward the axis of the assembled jaws so as to be clear of the die blocks at all times.

In testimony whereof we have hereunto set our hands.

CARL A. W. BRANDT.
ANTOINE J. LANGELIER.